(12) United States Patent
Hamakita

(10) Patent No.: US 8,381,868 B2
(45) Date of Patent: Feb. 26, 2013

(54) ELECTRIC POWER STEERING SYSTEM

(75) Inventor: Jun Hamakita, Kashihara (JP)

(73) Assignee: JTEKT Corporation, Osaka (JP)

( * ) Notice: Subject to any disclaimer, the term of this patent is extended or adjusted under 35 U.S.C. 154(b) by 0 days.

(21) Appl. No.: 13/215,882

(22) Filed: Aug. 23, 2011

(65) Prior Publication Data

US 2012/0048640 A1 Mar. 1, 2012

(30) Foreign Application Priority Data

Aug. 30, 2010 (JP) ................................ 2010-192555
Mar. 16, 2011 (JP) ................................ 2011-057906
Jun. 21, 2011 (JP) ................................ 2011-137303

(51) Int. Cl.
*B62D 5/04* (2006.01)
(52) U.S. Cl. ........................ 180/444; 180/443
(58) Field of Classification Search .............. 180/444, 180/443
See application file for complete search history.

(56) References Cited

U.S. PATENT DOCUMENTS

| 7,213,677 B2 * | 5/2007 | Nakamura et al. ............ 180/444 |
| 2004/0182188 A1 | 9/2004 | Nakamura et al. |
| 2004/0245040 A1 * | 12/2004 | Eda et al. ...................... 180/444 |
| 2008/0236933 A1 * | 10/2008 | Kurokawa ...................... 180/444 |

FOREIGN PATENT DOCUMENTS

| JP | A-2003-26012 | 1/2003 |
| JP | B2-3951913 | 8/2007 |
| JP | B2-4349334 | 10/2009 |

* cited by examiner

*Primary Examiner* — Tony H. Winner
*Assistant Examiner* — Jacob Knutson
(74) *Attorney, Agent, or Firm* — Oliff & Berridge, PLC

(57) ABSTRACT

An electric power steering system includes a worm reduction gear. An end portion of worm shaft, the end portion being distant from a motor, is urged toward a worm wheel. The worm shaft is supported by a bearing at an end portion close to the motor. A movement inhibitor that includes an elastic element is arranged between the worm shaft and the bearing. The movement inhibitor allows the worm shaft to move within a predetermined range in a radial direction of the worm shaft with respect to the bearing and allows the worm shaft to move within a predetermined range in an axial direction of the worm shaft with respect to the bearing.

3 Claims, 4 Drawing Sheets

ELECTRIC POWER STEERING SYSTEM

INCORPORATION BY REFERENCE

The disclosure of Japanese Patent Applications No. 2010-192555 filed on Aug. 30, 2010, No. 2011-057906 filed on Mar. 16, 2011 and No. 2011-137303 filed on Jun. 21, 2011, including the specification, drawings and abstract, is incorporated herein by reference in its entirety.

BACKGROUND OF THE INVENTION

1. Field of the Invention

The invention relates to an electric power steering system that uses a motor as a steering assist force generation source.

2. Description of Related Art

An electric power steering system for a vehicle includes a motor for assisting steering and a reduction gear mechanism that transmits rotational force of the motor to a steering device. The electric power steering system is configured to assist the operation of the steering device in response to rotation of a steering member, using rotation of the motor, to thereby reduce a driver's steering effort.

The reduction gear mechanism includes a worm shaft and a worm wheel. The worm shaft rotates in accordance with the rotation of the motor. The worm wheel is in mesh with the worm shaft. In the electric power steering system that uses the reduction gear mechanism in this way, it is desirable to reduce the amount of a backlash at a meshing portion at which the worm shaft meshes with the worm wheel to thereby eliminate gear rattle due to the backlash during steering. Therefore, a structure that incorporates an adjustment mechanism described in, for example, U.S. Pat. No. 7,213,677 is used.

The adjustment mechanism has a structure in which a certain amount of internal clearance is formed at a motor-side bearing for the worm shaft, which is close to the motor, an oscillation center is set, and a bearing, which is distant from the motor, is pressed toward the worm wheel by a spring. In order to oscillate the worm shaft, it is necessary to set a certain amount of internal clearance at the motor-side bearing. If the internal clearance is too small, the stiffness of the worm shaft increases to overcome the spring load of the bearing distant from the motor and, as a result, the worm shaft does not oscillate. On the other hand, if the internal clearance is too large, noise occurs inside the bearing. Thus, the internal clearance of the motor-side bearing is formed under extremely strict dimensional management.

However, in the existing electric power steering system that is configured so as to reduce a backlash using the adjustment mechanism as described above, each time the vehicle is steered, a large load and a large running torque are applied to the adjustment mechanism in the radial direction. As a result, degradation, such as wear-out and abrasion, easily occurs at a tooth flank. In addition, it is necessary to increase a preload by pressing; however, the flexibility of increasing the preload is relatively low.

SUMMARY OF THE INVENTION

It is an object of the invention to provide an electric power steering system that is configured such that a worm shaft provided with an urging member is pressed to reduce the distance between the rotation centers of the worm shaft and a worm wheel in order to reduce a backlash and such that the durability of the worm shaft and worm wheel is improved.

An aspect of the invention relates to an electric power steering system, including: a worm shaft that is coupled to an output shaft of a motor so as to be operated in accordance with the output shaft; a rolling bearing that rotatably supports the worm shaft; a worm wheel that is in mesh with the worm shaft, and that is coupled to a steering device; an urging member that urges an end portion of the worm shaft, the end portion being distant from the motor, toward the worm wheel; and a movement inhibitor that is arranged between an inner peripheral surface of the bearing and the worm shaft. The movement inhibitor includes an elastic element, and allows the worm shaft to move within a predetermined range in a radial direction of the worm shaft with respect to the bearing and allows the worm shaft to move within a predetermined range in an axial direction of the worm shaft with respect to the bearing.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
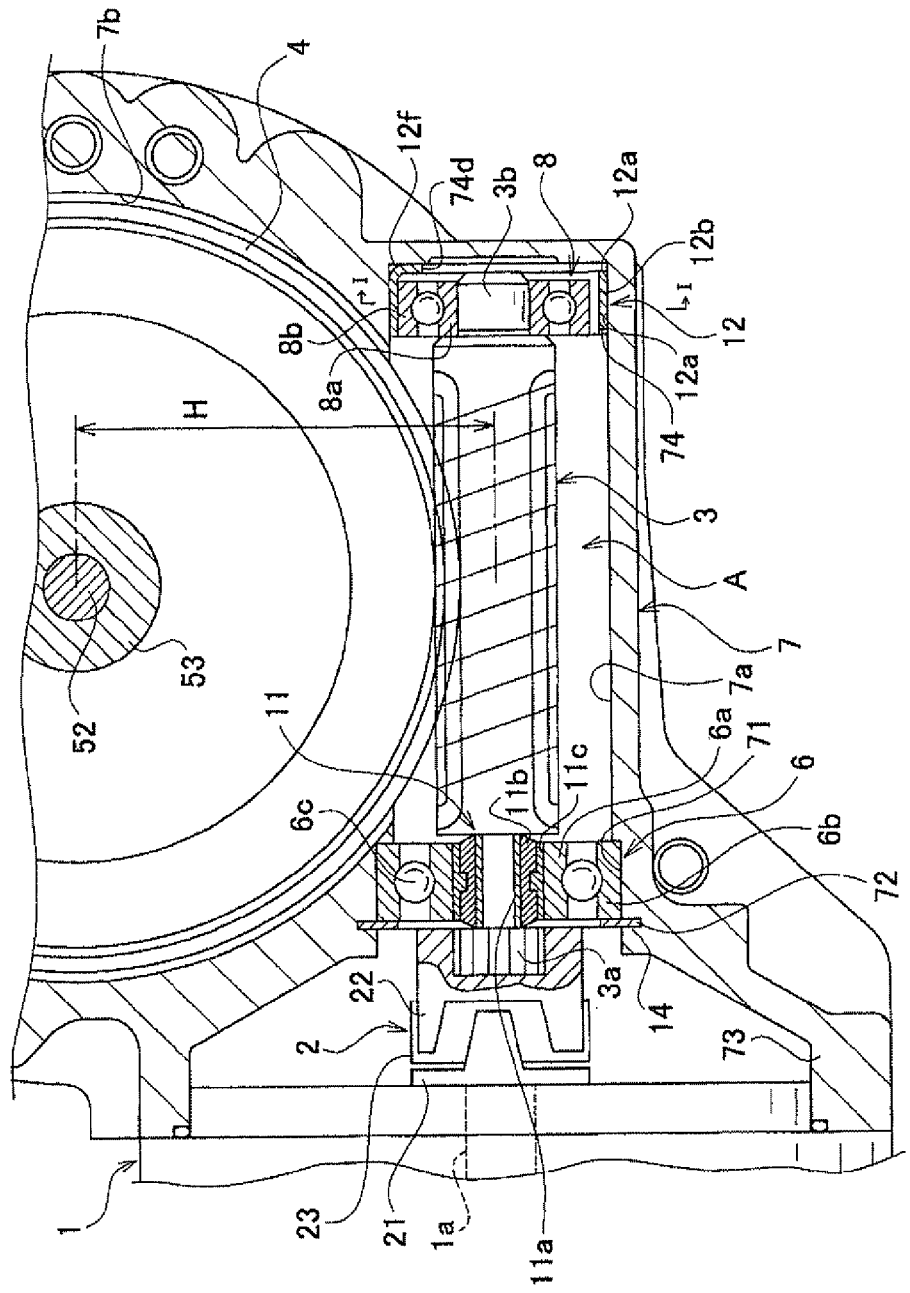
FIG. 1 is an enlarged sectional view that shows the configuration of a reduction gear mechanism portion of an electric power steering system according to an embodiment of the invention.
Figure 2:
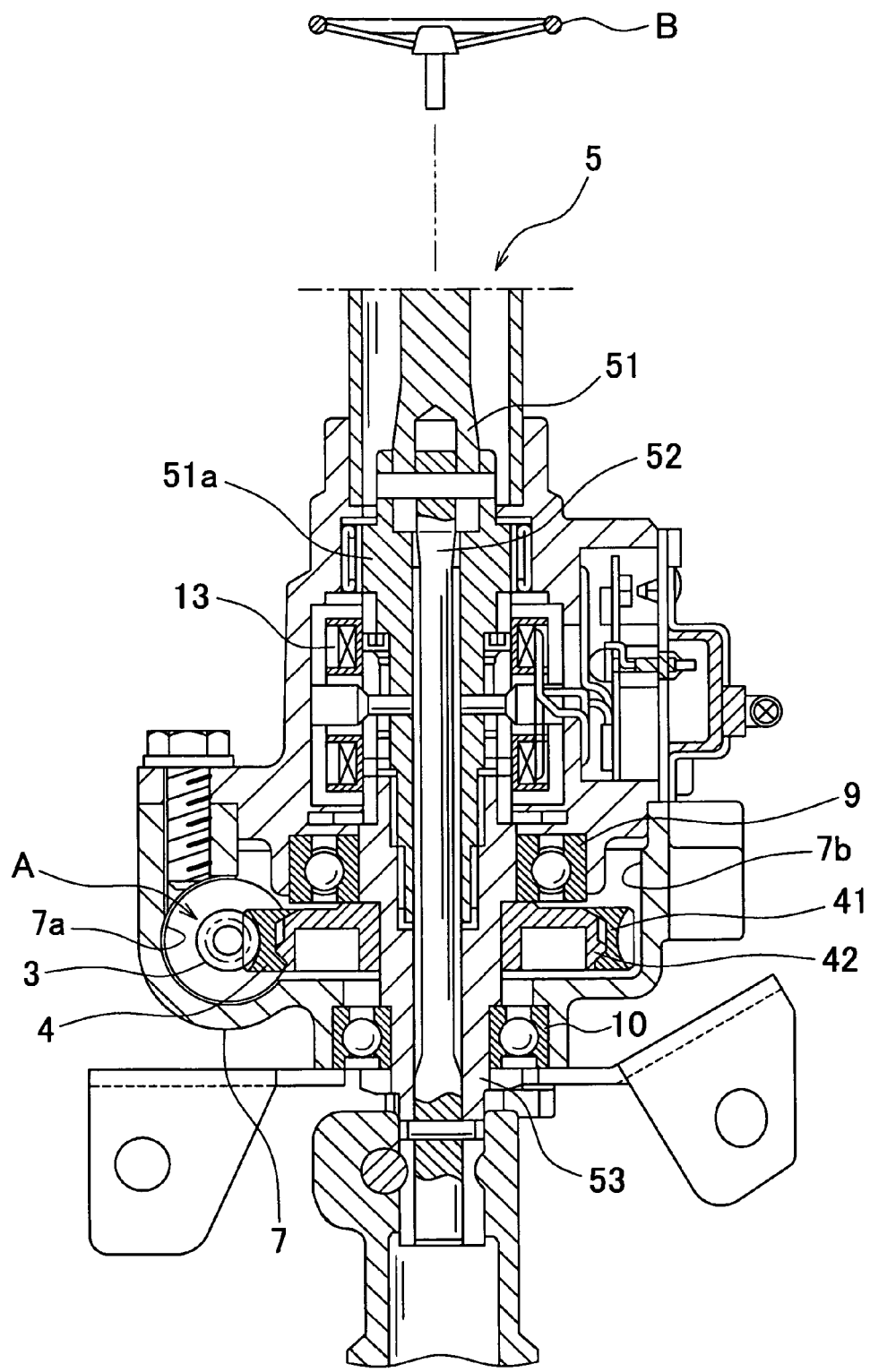
FIG. 2 is a sectional view that shows the overall configuration of the electric power steering system according to the embodiment of the invention.

Hereinafter, an embodiment of the invention will be described in detail with reference to the accompanying drawings. FIG. 1 is an enlarged sectional view that shows the configuration of a reduction gear mechanism portion of an electric power steering system according to the embodiment of the invention. FIG. 2 is a sectional view that shows the overall configuration of the electric power steering system.

The electric power steering system includes a motor 1 for assisting steering, a reduction gear mechanism A and a steering device 5. The reduction gear mechanism A has a worm shaft 3 and a worm wheel 4. The worm shaft 3 is coupled to an output shaft 1*a* of the motor 1 via a shaft coupling 2. The worm wheel 4 is in mesh with the worm shaft 3. The steering device 5 is coupled to the reduction gear mechanism A.

The steering device 5 includes a first steering shaft 51, a torsion bar 52 and a second steering shaft 53. The first steering shaft 51 is connected at one end to a steering wheel 13 for steering, and the first steering shaft 51 has a cylindrical portion 51*a* at other end. The torsion bar 52 is inserted in the cylindrical portion 51*a* of the first steering shaft 51, and is coupled at one end to the cylindrical portion 51*a* of the first steering shaft 51. An outer peripheral portion of one end of the second steering shaft 53 is fitted to an inner peripheral portion of one end of the cylindrical portion 51*a*, and the other end of the second steering shaft 53 is coupled to the other end of the torsion bar 52. The torsion bar 52 is twisted by the action of steering torque applied to the steering wheel B. The second steering shaft 53 is connected to, for example, a rack-and-pinion steering mechanism (not shown) via a universal joint.

The worm shaft 3 of the reduction gear mechanism A has shaft portions 3a and 3b at respective ends. The shaft portion 3a at one end is coupled to the output shaft 1a of the motor 1 in a state where the shaft portion 3a is rotatably supported by an aluminum support member 7 via a first rolling bearing 6. The shaft portion 3b at the other end is supported by the support member 7 via a second rolling bearing 8. An inner ring 6a of the rolling bearing 6 is fitted to the shaft portion 3a via a movement inhibitor 11. An inner ring 8a of the rolling bearing 8 is fitted to the shaft portion 3b. The worm wheel 4 has an annular tooth element 41 and a core member 42. The annular tooth element 41 is made of synthetic resin. The core member 42 is made of metal and is connected to the inner side of the annular tooth element 41. The core member 42 is fixedly fitted to an intermediate portion of the second steering shaft 53.

The support member 7 has a first accommodating portion 7a and a second accommodating portion 7b. The first accommodating portion 7a accommodates the worm shaft 3, and rotatably supports the shaft portions 3a and 3b of the worm shaft 3 via the rolling bearings 6 and 8. The second accommodating portion 7b accommodates the worm wheel 4, and supports the worm wheel 4 via the second steering shaft 53 and two rolling bearings 9 and 10 that are fitted around the second steering shaft 53.

The first accommodating portion 7a extends in the axial longitudinal direction of the worm shaft 3. The first accommodating portion 7a has a support hole 71, an annular groove 72 and a motor mounting portion 73 at one end in the longitudinal direction thereof. The rolling bearing 6 is loosely fitted in the support hole 71 so that the rolling bearing 6 is supported. The annular groove 72 is contiguous with the support hole 71. A snap ring 14 is fitted in the annular groove 72. The snap ring 14 contacts an outer ring 6b of the rolling bearing 6 to restrict movement of the rolling bearing 6 in the axial longitudinal direction.

The rolling bearing 6 that supports the shaft portion 3a at one end includes the inner ring 6a, the outer ring 6b and a plurality of rolling elements 6c interposed between the inner ring 6a and the outer ring 6b.

Figure 3:
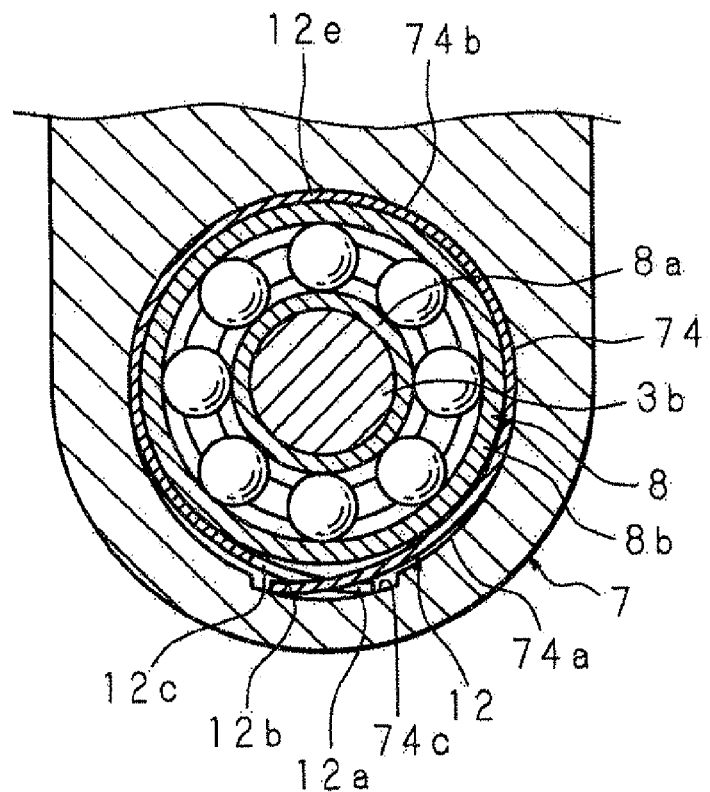
FIG. 3 is an enlarged sectional view of a movement inhibitor of the electric power steering system according to the embodiment of the invention.
Figure 4:
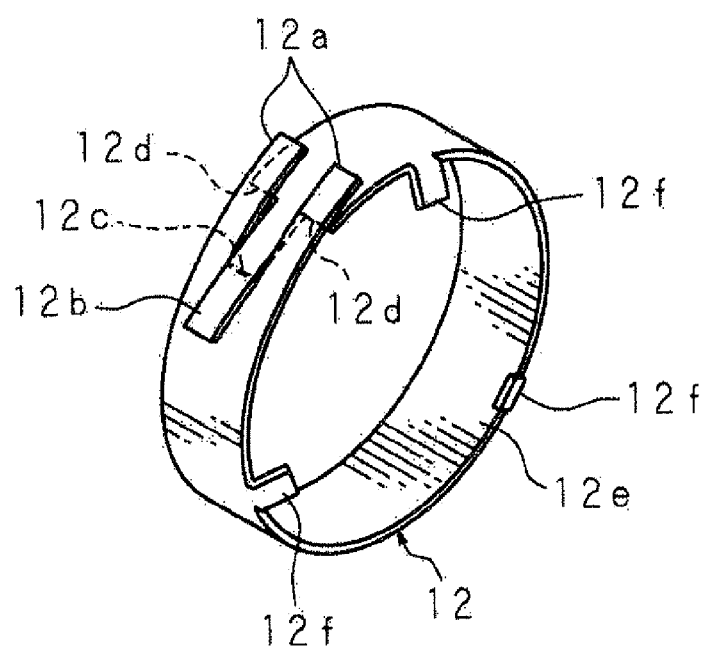
FIG. 4 is a perspective view that shows the configuration of a curved leaf spring of the electric power steering system according to the embodiment of the invention.

FIG. 3 is an enlarged sectional view that is taken along the line I-I in FIG. 1. FIG. 4 is a perspective view that shows the configuration of a curved leaf spring. A support hole 74 is formed at the other end of the first accommodating portion 7a. The support hole 74 is used to support the second rolling bearing 8 and a curved leaf spring 12 fitted around the rolling bearing 8. When the shaft portion 3b (rolling bearing 8) is pressed against a first inner peripheral surface 74a, the distance H between the rotation centers of the worm shaft 3 and worm wheel 4 (see FIG. 1) becomes long. When the shaft portion 3b (rolling bearing 8) is pressed against a second inner peripheral surface 74b, the distance H becomes short. The support hole 74 is formed in such an oval shape that the radius between the first inner peripheral surface 74a and the center of the support hole 74 is longer than the radius between the second inner peripheral surface 74b and the center of the support hole 74. Thus, the curved leaf spring 12 may be deflected between the first inner peripheral surface 74a and the rolling bearing 8. In addition, it is possible to set a sufficient amount of gap that allows the rolling bearing 8 to move in the direction in which the distance H between the rotation centers increases or reduces. Furthermore, a recess 74c is formed in the middle of the first inner peripheral surface 74a in the circumferential direction. The recess 74c accommodates ends 12a and 12b of the curved leaf spring 12.

The curved leaf spring 12 is formed of a band-like spring steel of which the intermediate portion in the longitudinal direction is curved in a substantially circular shape along the outer peripheral surface of the rolling bearing 8 and that has a length larger than the perimeter of the rolling bearing 8. The one end 12a has a cutout 12c at its center in the widthwise direction. The other end 12b has cutouts 12d at respective sides in the widthwise direction. The ends 12a are inserted into the cutout recesses 12d or the end 12b is inserted into the cutout recess 12c to thereby allow the ends 12a and 12b to intersect with each other without any increase in width. Furthermore, the ends 12a and 12b are located away from the outer peripheral surface of the rolling bearing 8, that is, a curved portion 12e. The ends 12a and 12b of the curved leaf spring 12 are inserted into the recess 74c and are deflected within the recess 74e to thereby urge, via the rolling bearing 8, the worm shaft 3 in the direction in which the distance H between the rotation centers is reduced.

A plurality of spring pieces 12f is formed integrally with the curved leaf spring 12. The spring pieces 12f are formed at one side of the curved portion 12e of the curved leaf spring 12 in the widthwise direction at positions apart from each other in the longitudinal direction of the curved leaf spring 12. The spring pieces 12f contact a side surface 74d of the support hole 74 to press the second rolling bearing 8 toward the motor 1. The spring pieces 12f each protrude so as to be inclined inward with respect to the peripheral surface of the curved portion 12e. Each of the spring pieces 12f is deflected by contacting the side surface 74d of the support hole 74. The reaction force of the elastic restoring force of each spring piece 12f acts on the outer ring 8b of the second rolling bearing 8 and presses the worm shaft 3 toward the motor 1 via the outer ring 8b, the rolling elements and the inner ring 8a.

A torque sensor 13 is installed in the support member 7. The torque sensor 13 detects a steering torque applied to the steering wheel B on the basis of a relative rotational displacement between the steering shafts 51 and 53 in response to the twist of the torsion bar 52. The motor 1 is subjected to drive control on the basis of the torque detected by the torque sensor 13, and the like.

In the thus configured electric power steering system, when the worm shaft 3 is installed, the curved leaf spring 12 is inserted into the support hole 74 of the support member 7 and then the ends 12a and 12b of the curved leaf spring 12 are inserted into the recess 74c to set the position of the curved leaf spring 12. Thus, it is possible to set the direction in which the ends 12a and 12b urge the rolling bearing 8. The inner ring 6a of the rolling bearing 6 is fitted to the shaft portion 3a of the worm shaft 3 via the movement inhibitor 11, and the inner ring 8a of the rolling bearing 8 is fitted to the shaft portion 3b of the worm shaft 3. Then, the worm shaft 3 is inserted in the first accommodating portion 7a. The second rolling bearing 8 is placed on the inner side of the curved leaf spring 12. The first rolling bearing 6 is loosely fitted in the support hole 71. The snap ring 14 is fitted in the annular groove 72.

The ends 12a and 12b of the curved leaf spring 12 that urges the installed worm shaft 3 are inserted in the recess 74c of the support member 7 to urge the rolling bearing 8 and the worm shaft 3 supported by the rolling bearing 8 in the direction in which the distance H between the rotation centers is reduced (toward the worm wheel) using the deflection of the ends 12a and 12b. Thus, it is possible to reduce the backlash of the meshing portion at which the worm shaft 3 meshes with worm wheel 4, and, in addition, it is possible to reduce the backlash of the meshing portion even when the amount of wear of the teeth of the worm shaft 3 or worm wheel 4 increases.

The curved leaf spring 12 is curved along the outer peripheral surface of the rolling bearing 8, so it is possible to eliminate the gap between the curved leaf spring 12 and the rolling bearing 8 and the gap between the curved leaf spring 12 and the second inner peripheral surface 74*b* of the support hole 74. Thus, it is possible to restrict the worm shaft 3 from moving in a direction that intersects with the direction in which the distance H between the rotation centers increases or reduces. More specific description will be provided below. The tooth traces of the worm shaft 3 and worm wheel 4 are twisted with respect to the rotation center line. As a result, when running torque is applied from the worm shaft 3 on the worm wheel 4, in other words, when steering is assisted by the rotation of the motor 1, component force (hereinafter, referred to as meshing reaction force) occurs so that the worm shaft 3 moves in the radial direction of the worm wheel 4 along the tooth trace of the worm wheel 4. The meshing reaction force presses the worm shaft 3 in the radial direction of the worm wheel 4, and the pressing force presses the second rolling bearing 8 in the direction that intersects with the direction in which the distance between the rotation centers increases or reduces. Movement of the rolling bearing 8 and, consequently, movement of the worm shaft 3 due to the pressing may be restricted.

The worm shaft 3 urged by the curved leaf spring 12 as described above oscillates, in the direction in which the distance H between the rotation centers increases or reduces, about the support portion of the worm shaft 3, supported by the first rolling bearing 6. At this time, the first rolling bearing 6 supports the shaft portion 3*a* of the worm shaft 3 via the movement inhibitor 14, so there is no gap between the worm shaft 3 and the bearing 6. Furthermore, the worm shaft 3 is coupled to the output shaft 1*a* via the shaft coupling 2 having an elastic tooth element 23, so an allowable oscillation amount of the worm shaft 3 may be increased. Thus, even when the amount of expansion of the worm wheel 4 having the synthetic resin annular tooth element 41 increases due to an increase in temperature and absorption of moisture, it is possible to suppress an increase in the meshing resistance of the meshing portion, so the worm shaft 3 and the worm wheel 4 may be smoothly rotated.

In addition, the worm shaft 3 is pressed in a direction away from the motor 1 by the shaft coupling 2 having first and second coupling elements 21 and 22 and the elastic tooth element 23 interposed between the coupling elements 21 and 22. In addition, the worm shaft 3 is pressed toward the motor 1 by the spring pieces 12*f* of the curved leaf spring 12, so it is possible to maintain a balance between forces that act on the worm shaft 3 in the axial longitudinal direction to thereby make it possible to improve the rotational performance of the worm shaft 3.

In addition, the worm shaft 3 is connected to the output shaft 1*a* by the shaft coupling 2 having the elastic tooth element 23, so propagation of noise generated at the motor 1-side to the worm shaft 3 is interrupted by the elastic tooth element 23, and noise at the shaft coupling portion is eliminated.

Figure 5:
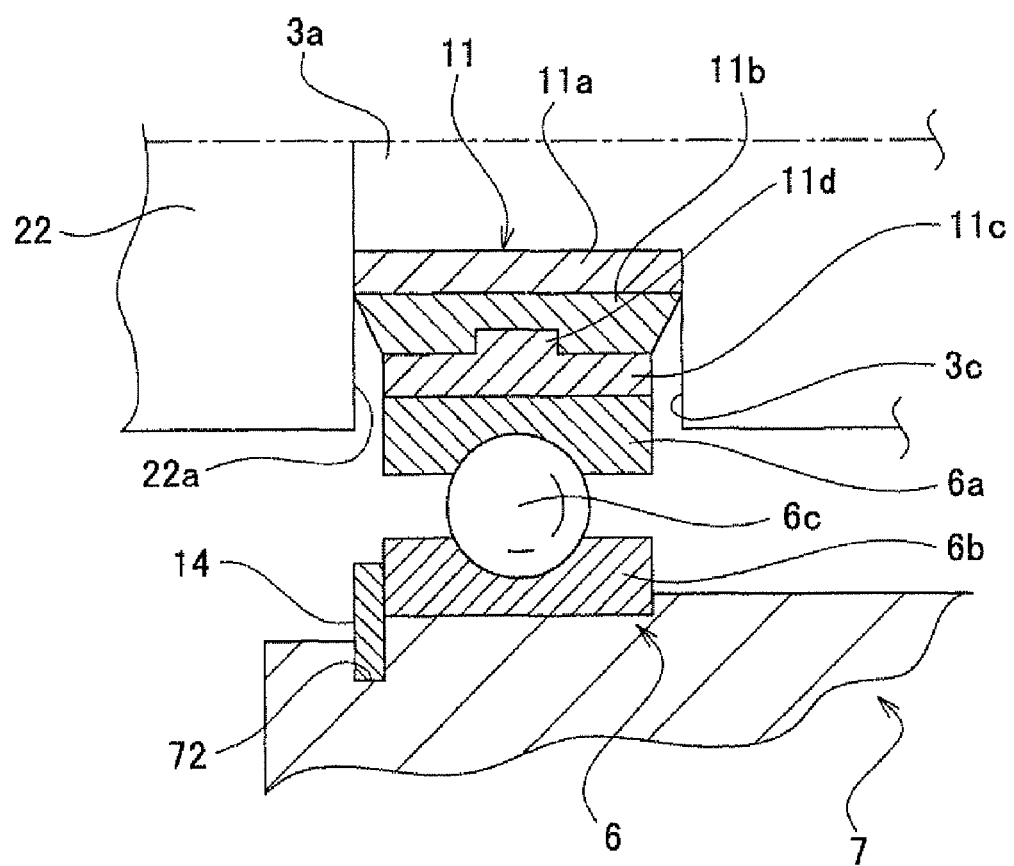
FIG. 5 is a sectional view of a main portion of the electric power steering system according to the embodiment of the invention.

As shown in FIG. 1 and FIG. 5, the movement inhibitor 11 according to the present embodiment is fitted to and held by the shaft portion 3*a* of the worm shaft 3 supported rotatably by the rolling bearing 6. The movement inhibitor 11 inhibits movement of the worm shaft 3 in the axial longitudinal direction. The movement inhibitor 11 includes a metal inner ring 11*a*, a metal outer ring 11*c* and an elastic element 11*b*. The metal inner ring 11*a* is fitted around the outer peripheral surface of the shaft portion 3*a* of the worm shaft 3. The inner peripheral surface of the metal outer ring 11*c* is larger in diameter than the outer peripheral surface of the metal inner ring 11*a*. The metal outer ring 11*c* is fitted to the inner ring 6*a* of the rolling bearing 6. The elastic element 11*b* is bonded by cure adhesion, or the like, between the outer peripheral surface of the inner ring 11*a* and the inner peripheral surface of the outer ring 11*c*.

As shown in FIG. 5, in the axial direction of the worm shaft 3, the position of the inner ring 11*a* is determined by an end surface 3*c* of the worm shaft 3 and a coupling end surface 22*a*. The outer ring 11*c* has the same size in the axial direction of the worm shaft 3 as the inner ring 6*a*. The elastic element 11*b* has a substantially trapezoidal shape in cross section so as to connect the ends of both rings 11*a* and 11*c*. The inner ring 11*a* is press-fitted to the shaft portion 3*a*. A coupling 22 is fitted to the shaft portion 3*a*. An elastic tooth element 23 is fitted between the coupling 22 and a first coupling element 21. The coupling 22 is fitted to the first coupling element 21 via the elastic tooth element 23. A shaft coupling 2 includes the coupling 22, the first coupling element 21 and the elastic tooth element 23. The shaft coupling 2 is coupled to the output shaft 1*a* (see FIG. 1). There are gaps between one end surfaces of the outer ring 11*c* and the bearing inner ring 6 and the end surface 3*c*, and between the other end surfaces of the outer ring 11*c* and the bearing inner ring 6*a* and the coupling end surface 22*a* in the axial direction, so the worm shaft 3 is allowed to move within the above gaps that have predetermined distances in the axial direction. In addition, when the outer ring 11*c* and the bearing inner ring 6*a* contact the end surface 3*c* or the coupling end surface 22*a*, the movement of the worm shaft 3 in the axial direction is restricted and thus the worm shaft 3 is prevented from moving by an excessive amount. As a result, durability of the elastic member 11*b* is secured.

The outer ring 11*c* has a radial protruding portion 11*d* at the center on the inner peripheral surface. The radial protruding portion 11*d* protrudes toward the elastic element 11*b*. The protruding portion 11*d* may be formed not at the outer ring 11*c* but at the inner ring 11*a*. The elastic element 11*b* has cylindrical portion, and a recess that is formed in a peripheral surface of the cylindrical portion and that receives the protruding portion 11*d*. Note that, instead of the protruding portion of the outer ring 11*c* or the inner ring 11*a*, a recess (not shown in the figure) may be formed in the outer ring 11*c* or the inner ring 11*a*. Further, instead of the recess in the elastic element 11*b*, a protruding portion may be formed at the elastic element 11*b*. Thus, the shaft portion 3*a* is allowed to move in the radial direction within a predetermined range that corresponds to the distance between the outer peripheral surface of the protruding portion 11*d* and the inner peripheral surface of the inner ring 11*a*. In addition, when the outer peripheral surface of the protruding portion 11*d* substantially contacts the inner peripheral surface of the inner ring 11*a*, the movement of the worm shaft 3 in the radial direction is restricted and thus the worm shaft 3 is prevented from moving by an excessive amount. As a result, durability of the elastic member 11*b* is secured. In the thus configured electric power steering system, the curved leaf spring 12 presses the worm shaft 3 toward the worm wheel 4. At this time, the worm shaft 3 oscillates about the shaft portion 3*a* supported by the bearing 6. The shaft portion 3*a* is elastically supported by the bearing 6 owing to the movement inhibitor 11, so highly accurate gap size management between the outer peripheral surface of the shaft portion and the inner peripheral surface of the bearing is not required unlike in the existing art. In addition, the worm shaft 3 is supported movably in the axial direction by the movement inhibitor 11. Thus, when the amount of steering is so small that the motor 1 is not driven, the worm shaft 3 is moved in the axial direction by the rotation of the worm wheel 4, so it is possible to soften sense of discomfort given to a driver. In addition, when excessive reverse torque is input, for example, when the vehicle drives over a curb, the movement inhibitor 11 restricts the amount of movement of the shaft portion 3a in the axial direction and in the radial direction with respect to the bearing 6, so load on the elastic element 11b is suppressed to thereby improve the durability of the elastic element 11b. With the above configuration, the movement inhibitor 11 restricts movement of the outer ring 11c in the axial direction and in the radial direction, so load on the elastic element 11b is restricted to impart durability to the elastic element 11b.

With the electric power steering system according to the present embodiment, when the tooth surface of the worm shaft contacts the tooth surface of the worm wheel, the elastic element is deformed to move the rotary shaft in at least one of the axial direction and the radial direction with respect to the housing. According to the present embodiment, it is possible to cope with a large backlash, and the elastic element damps a collision between the tooth surfaces against vibrations transmitted form wheels and against vibrations transmitted from the motor to thereby make it possible to reduce a rattle of the tooth surfaces. Furthermore, the elastic element and the rings are integrally formed, so they have a sufficient strength against load on the bearing, they are easily and accurately fitted to the bearing and the worm shaft, and they are less likely to deviate or extend off in the axial direction to thereby make it possible to maintain performance for a long period of time.

What is claimed is:

1. An electric power steering system for use with a motor having an output shaft, the system comprising:
    a worm shaft that is coupled to the output shaft of the motor so as to be operated in accordance with the output shaft;
    a first rolling bearing and a second rolling bearing that rotatably support the worm shaft, the first rolling bearing being arranged at one end of the worm shaft near the motor, and the second rolling bearing being arranged at the other end of the worm shaft distant from the motor;
    a support member that supports the first rolling bearing and the second rolling bearing;
    a steering device;
    a worm wheel that is in mesh with the worm shaft, and that is coupled to the steering device;
    an urging member that urges the other end of the worm shaft toward the worm wheel; and
    a movement inhibitor that is arranged between an inner peripheral surface of the first rolling bearing and the worm shaft, the movement inhibitor including an elastic element, and allowing the worm shaft to move: (1) within a predetermined range in a radial direction of the worm shaft with respect to the first rolling bearing and (2) within a predetermined range in an axial direction of the worm shaft with respect to the first rolling bearing, wherein
    the movement inhibitor includes a metal inner ring and a metal outer ring, where the elastic element is: (1) positioned between the metal inner ring and the metal outer ring, (2) bonded to an outer peripheral surface of the inner ring and (2) bonded to an inner peripheral surface of the outer ring, and
    the first rolling bearing being arranged between an outer peripheral surface of the movement inhibitor and the support member.

2. The electric power steering system according to claim 1, wherein
    at least one of the inner ring and the outer ring has a recess portion that is recessed in the radial direction of the worm shaft or a protruding portion that protrudes in the radial direction of the worm shaft; and wherein
    the elastic element has a cylindrical portion, and a protruding portion or recess portion that is formed in a peripheral surface of the cylindrical portion and that matches the recess portion or protruding portion of at least one of the inner ring and the outer ring.

3. The electric power steering system according to claim 1, wherein
    the elastic element has a trapezoidal shape in cross section so as to connect the ends of both the metal inner ring and the metal outer ring.

* * * * *